United States Patent [19]

Pao et al.

[11] 4,440,977

[45] Apr. 3, 1984

[54] PUSHBUTTON DECODER AND PRINTER

[76] Inventors: John Pao, 527 Madera Dr., San Mateo, Calif. 94403; Burton R. Tunzi, 2904 Scott Blvd., Santa Clara, Calif. 95050

[21] Appl. No.: 60,739

[22] Filed: Jul. 25, 1979

[51] Int. Cl.³ .............................................. H04M 11/06
[52] U.S. Cl. ......................... 179/2 DP; 179/84 VF; 400/613
[58] Field of Search ................. 179/2 DP, 84 VF; 400/613; 219/216

[56] References Cited

U.S. PATENT DOCUMENTS

| | | | |
|---|---|---|---|
| 3,870,821 | 3/1975 | Stewry | 179/2 DP |
| 3,959,603 | 5/1976 | Nilssen et al. | 179/84 VF |
| 3,967,273 | 6/1976 | Knowlton | 179/2 DP X |
| 3,995,730 | 12/1976 | Kwan et al. | 400/613 |
| 4,012,599 | 3/1977 | Meyer | 179/84 VF |
| 4,021,608 | 5/1977 | Brodewr | 219/216 |

*Primary Examiner*—Joseph A. Popek
*Attorney, Agent, or Firm*—Jack M. Wiseman; Francis W. Anderson

[57] ABSTRACT

Apparatus for sequentially printing characters along a ribbon or paper tape in response to receiving a sequence of touch tone signals. The apparatus comprises a touch tone decoder and a printer. Included in the touch tone decoder is a dual tone multiple frequency analyzing circuit which receives the touch tone signals and transmits therefrom BCD signals and control logic signals. A select function control circuit is responsive to the BCD signals and the control logic signals to select an ROM memory from a group of ROM memories. A select letter control circuit receives the BCD signals and the control logic signals and addresses the selected ROM memory to produce a parallel multiplex output signal for controlling the operation either of a matrix or a line print head of the printer. Included in the printer is a motor circuit and a control circuit to advance the ribbon or paper tape past the matrix or the line print head. Signals from the touch tone decoder operate the step motor control circuit for controlling the operation of the motor circuit. The matrix or line print head receives the output signal from the selected ROM memory and is operative to print a character or several successive lines or columns of dots in the advancing ribbon or paper tape in accordance with touch tone signals transmitted to the touch tone decoder.

5 Claims, 27 Drawing Figures

Fig. 3

|  | H₁ | H₂ | H₃ | H₄ |
|---|---|---|---|---|
| L₁ | .QZ 1 | ABC 2 | DEF 3 | + |
| L₂ | GHI 4 | JKL 5 | MNO 6 | − |
| L₃ | PRS 7 | TUV 8 | WXY 9 | × |
| L₄ | * | 0 | # | ÷ |

Fig. 4

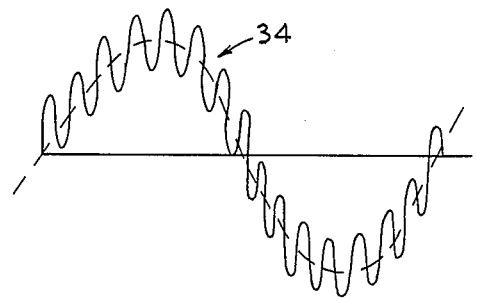

Fig. 5
DUAL TONE MULTIPLE FREQUENCY TABLE

| L+H (1-OF-4-TWICE) | BCD | DECIMAL |
|---|---|---|
| L₁ H₁ | 0001 | 1 |
| L₁ H₂ | 0010 | 2 |
| L₁ H₃ | 0011 | 3 |
| L₁ H₄ | XXXX | + |
| L₂ H₁ | 0100 | 4 |
| L₂ H₂ | 0101 | 5 |
| L₂ H₃ | 0111 | 6 |
| L₂ H₄ | XXXX | − |
| L₃ H₁ | 1000 | 7 |
| L₃ H₂ | 1001 | 8 |
| L₃ H₃ | 1010 | 9 |
| L₃ H₄ | XXXX | × |
| L₄ H₁ | XXXX | * |
| L₄ H₂ | XXXX | 0 |
| L₄ H₃ | XXXX | # |
| L₄ H₄ | XXXX | ÷ |

Fig. 6
ALPHA CHARACTER CODE

| CHARACTER | FIRST KEY ACTUATED (PAO FIG.3) | SECOND KEY ACTUATED (PAO FIG.3) |
|---|---|---|
| A | L₁ H₂ | L₄ H₁ (*) |
| B | L₁ H₂ | L₄ H₂ (0) |
| C | L₁ H₂ | L₄ H₃ (#) |
| D | L₁ H₃ | L₄ H₁ (*) |
| E | L₁ H₃ | L₄ H₂ (0) |
| F | L₁ H₃ | L₄ H₃ (#) |
| G | L₂ H₁ | L₄ H₁ (*) |
| H | L₂ H₁ | L₄ H₂ (0) |
| I | L₂ H₁ | L₄ H₃ (#) |
| J | L₂ H₂ | L₄ H₁ (*) |
| K | L₂ H₂ | L₄ H₂ (0) |
| L | L₂ H₂ | L₄ H₃ (#) |
| M | L₂ H₃ | L₄ H₁ (*) |
| N | L₂ H₃ | L₄ H₂ (0) |
| O | L₂ H₃ | L₄ H₃ (#) |
| P | L₃ H₁ | L₄ H₁ (*) |
| Q | L₁ H₁ | L₄ H₂ (0) |
| R | L₃ H₁ | L₄ H₂ (0) |
| S | L₃ H₁ | L₄ H₃ (#) |
| T | L₃ H₂ | L₄ H₁ (*) |
| U | L₃ H₂ | L₄ H₂ (0) |
| V | L₃ H₂ | L₄ H₃ (#) |
| W | L₃ H₃ | L₄ H₁ (*) |
| X | L₃ H₃ | L₄ H₂ (0) |
| Y | L₃ H₃ | L₄ H₃ (#) |
| Z | L₁ H₁ | L₄ H₃ (#) |
| . | L₁ H₁ | L₄ H₁ (*) |

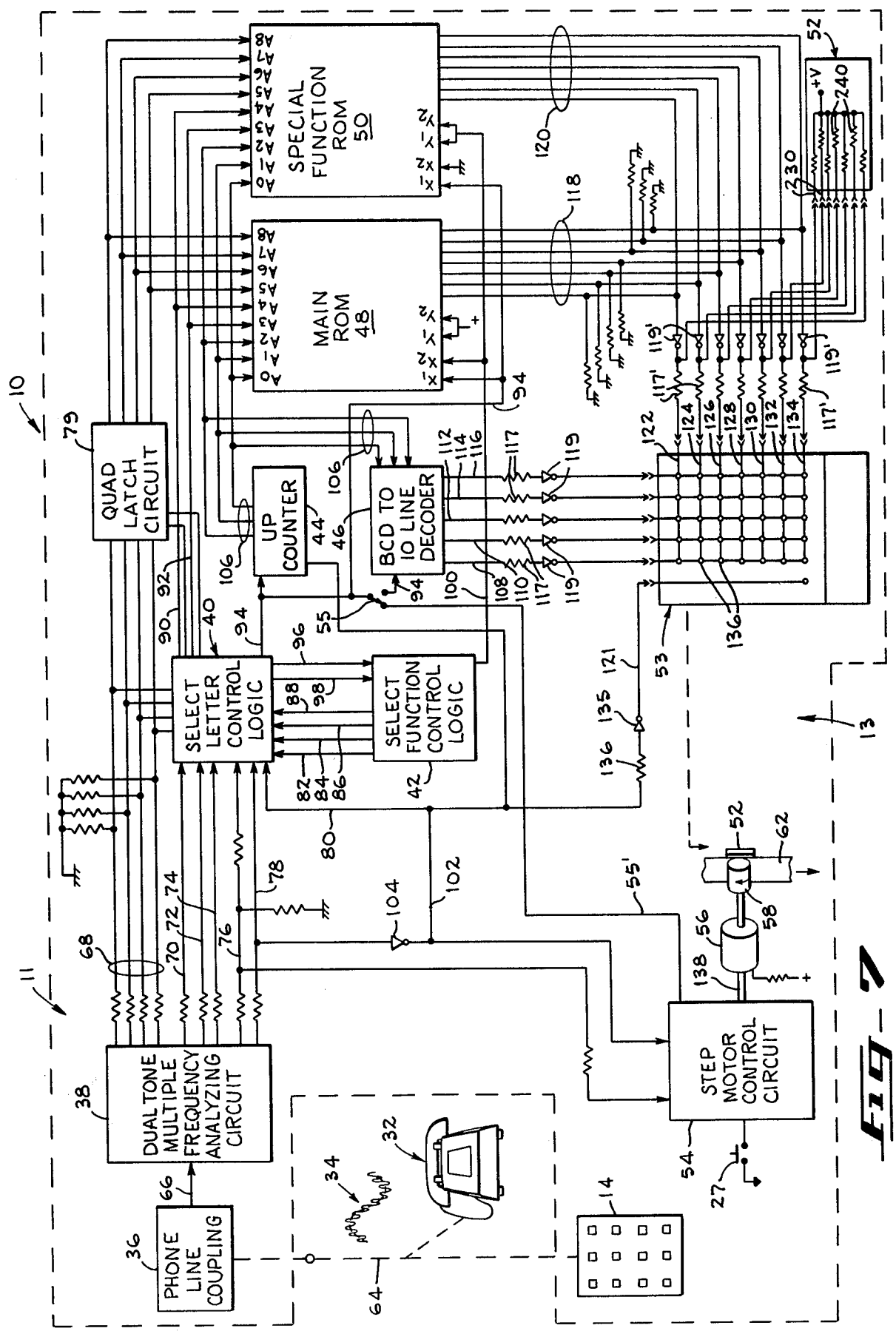

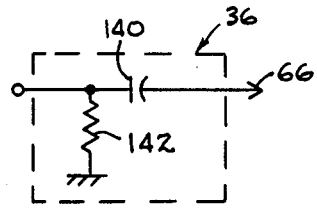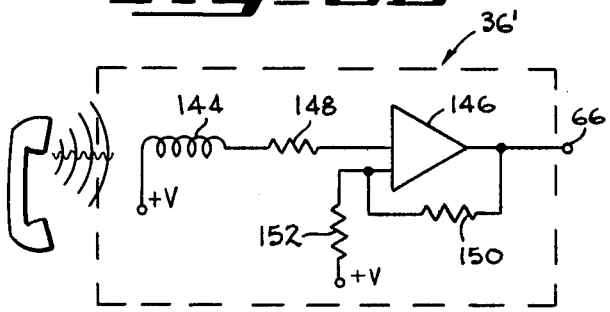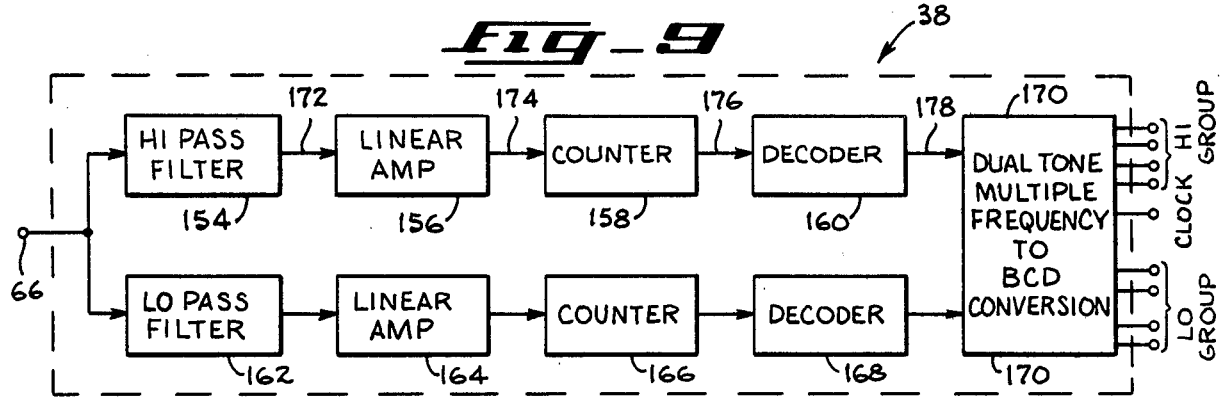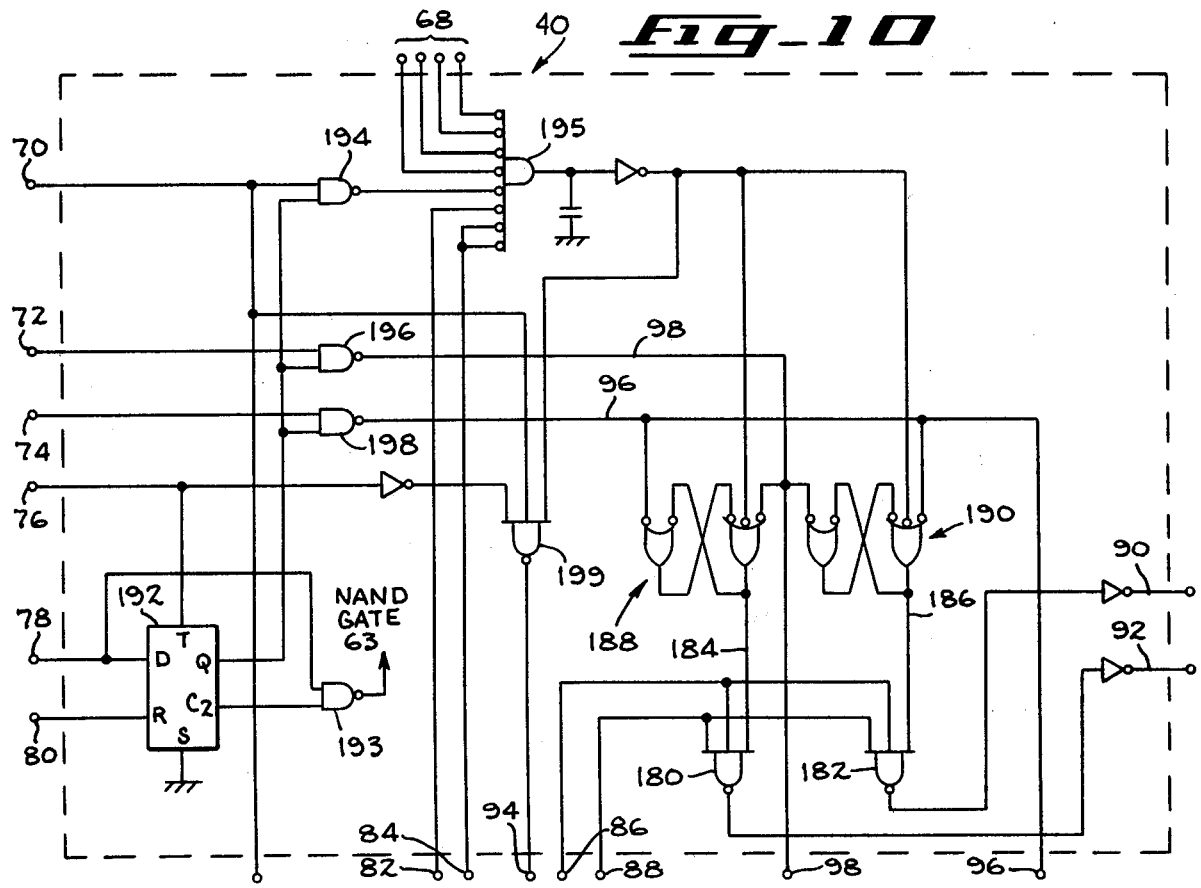

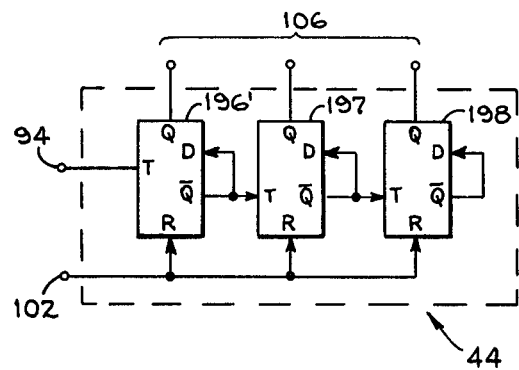
Fig_11
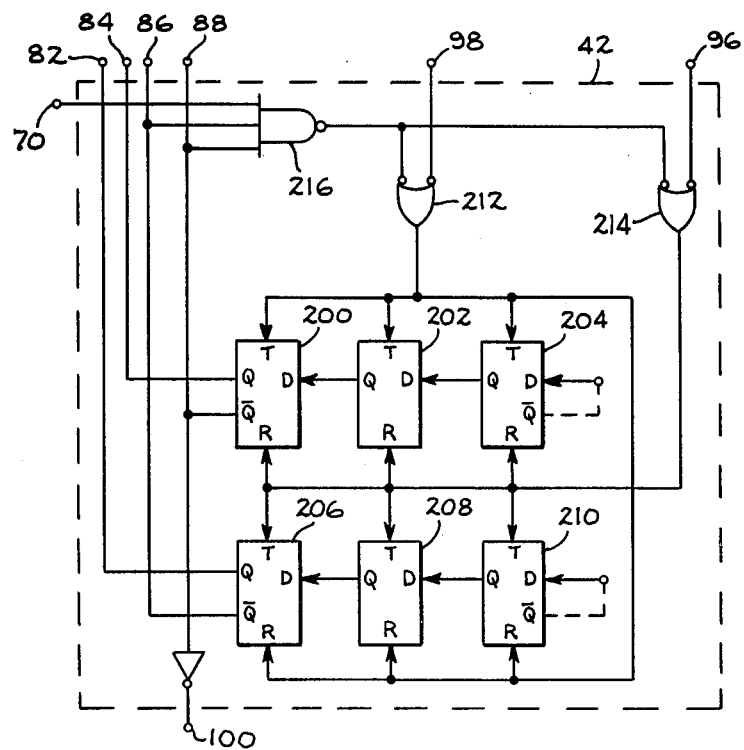
Fig_12

Fig_13

| | A8 | A7 | A6 | A5 | A4 | A3 | A2 | A1 | A0 | |
|---|---|---|---|---|---|---|---|---|---|---|
| NUMBERS | 0 | 0 | 0 | 0 | 0 | 0 | X | X | X | 0 |
| | 0 | 0 | 0 | 0 | 0 | 1 | X | X | X | 1 |
| | 0 | 0 | 0 | 0 | 1 | 0 | X | X | X | 2 |
| | 0 | 0 | 0 | 0 | 1 | 1 | X | X | X | 3 |
| | 0 | 0 | 0 | 1 | 0 | 0 | X | X | X | 4 |
| | 0 | 0 | 0 | 1 | 0 | 1 | X | X | X | 5 |
| | 0 | 0 | 0 | 1 | 1 | 0 | X | X | X | 6 |
| | 0 | 0 | 0 | 1 | 1 | 1 | X | X | X | 7 |
| | 0 | 0 | 1 | 0 | 0 | 0 | X | X | X | 8 |
| | 0 | 0 | 1 | 0 | 0 | 1 | X | X | X | 9 |

| | A8 | A7 | A6 | A5 | A4 | A3 | A2 | A1 | A0 | |
|---|---|---|---|---|---|---|---|---|---|---|
| RIGHT LETTERS | 1 | 0 | 0 | 0 | 0 | 0 | X | X | X | . |
| | 1 | 0 | 0 | 0 | 0 | 1 | X | X | X | Z |
| | 1 | 0 | 0 | 0 | 1 | 0 | X | X | X | C |
| | 1 | 0 | 0 | 0 | 1 | 1 | X | X | X | F |
| | 1 | 0 | 0 | 1 | 0 | 0 | X | X | X | I |
| | 1 | 0 | 0 | 1 | 0 | 1 | X | X | X | Z |
| | 1 | 0 | 0 | 1 | 1 | 0 | X | X | X | O |
| | 1 | 0 | 0 | 1 | 1 | 1 | X | X | X | S |
| | 1 | 0 | 1 | 0 | 0 | 0 | X | X | X | V |
| | 1 | 0 | 1 | 0 | 0 | 1 | X | X | X | Y |

| | A8 | A7 | A6 | A5 | A4 | A3 | A2 | A1 | A0 | |
|---|---|---|---|---|---|---|---|---|---|---|
| LEFT LETTERS | 0 | 1 | 0 | 0 | 0 | 0 | X | X | X | |
| | 0 | 1 | 0 | 0 | 0 | 1 | X | X | X | . |
| | 0 | 1 | 0 | 0 | 1 | 0 | X | X | X | A |
| | 0 | 1 | 0 | 0 | 1 | 1 | X | X | X | D |
| | 0 | 1 | 0 | 1 | 0 | 0 | X | X | X | G |
| | 0 | 1 | 0 | 1 | 0 | 1 | X | X | X | J |
| | 0 | 1 | 0 | 1 | 1 | 0 | X | X | X | M |
| | 0 | 1 | 0 | 1 | 1 | 1 | X | X | X | P |
| | 0 | 1 | 1 | 0 | 0 | 0 | X | X | X | T |
| | 0 | 1 | 1 | 0 | 0 | 1 | X | X | X | W |

| | A8 | A7 | A6 | A5 | A4 | A3 | A2 | A1 | A0 | |
|---|---|---|---|---|---|---|---|---|---|---|
| MIDDLE LETTERS | 1 | 1 | 0 | 0 | 0 | 0 | X | X | X | |
| | 1 | 1 | 0 | 0 | 0 | 1 | X | X | X | Q |
| | 1 | 1 | 0 | 0 | 1 | 0 | X | X | X | B |
| | 1 | 1 | 0 | 0 | 1 | 1 | X | X | X | E |
| | 1 | 1 | 0 | 1 | 0 | 0 | X | X | X | H |
| | 1 | 1 | 0 | 1 | 0 | 1 | X | X | X | K |
| | 1 | 1 | 0 | 1 | 1 | 0 | X | X | X | N |
| | 1 | 1 | 0 | 1 | 1 | 1 | X | X | X | R |
| | 1 | 1 | 1 | 0 | 0 | 0 | X | X | X | U |
| | 1 | 1 | 1 | 0 | 0 | 1 | X | X | X | X |

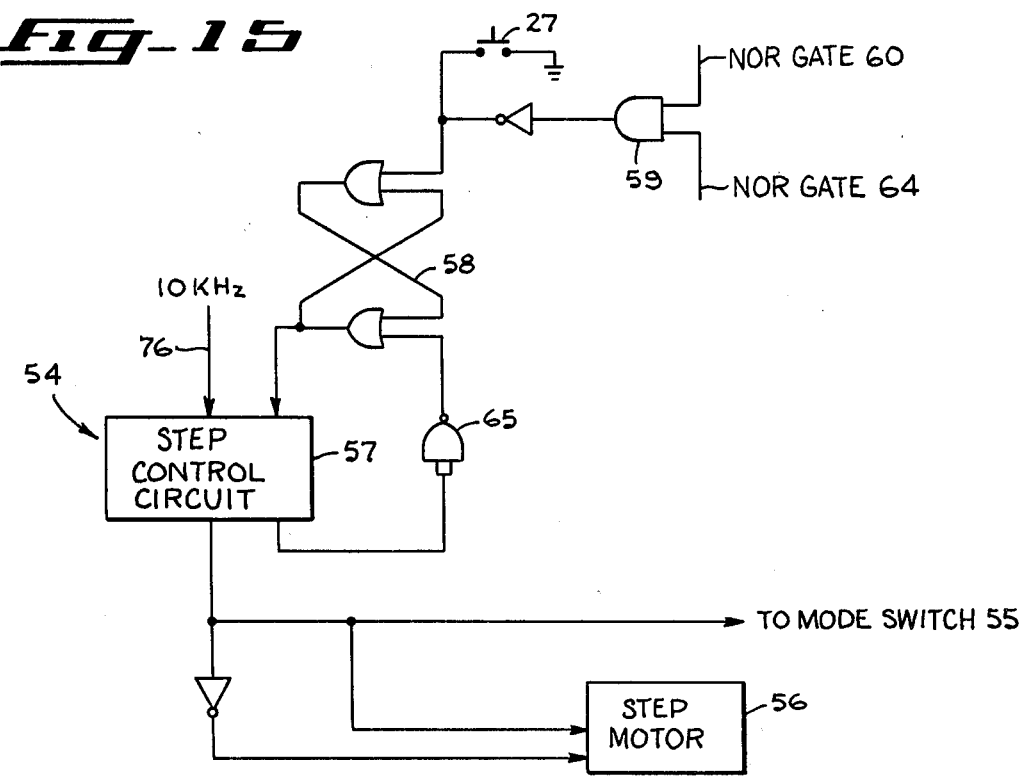
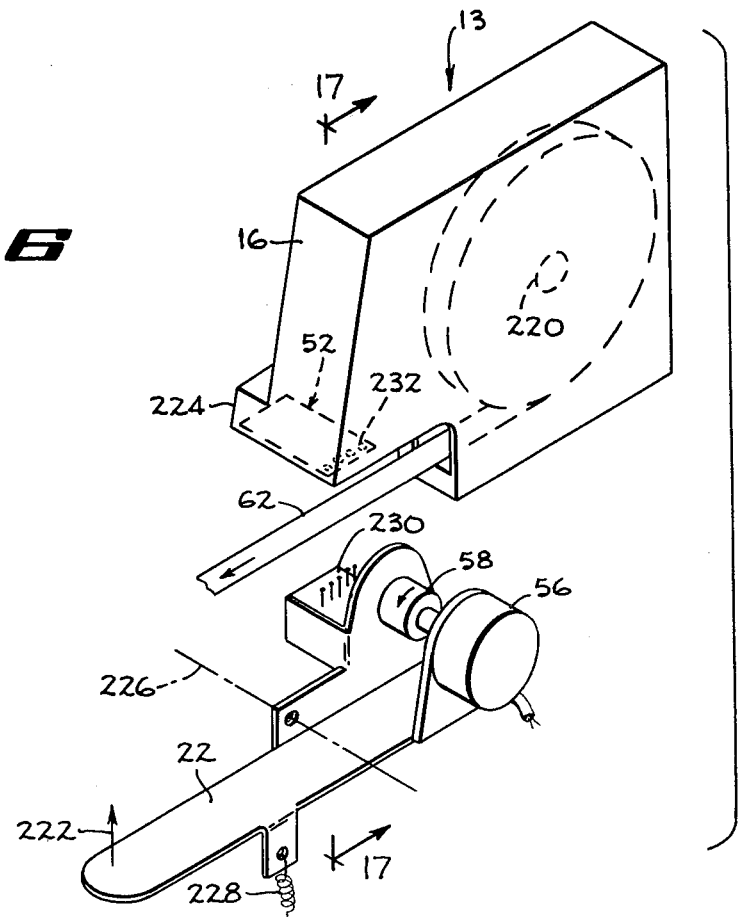

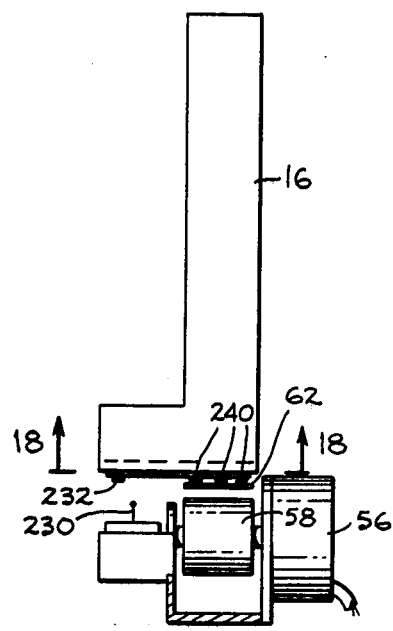
Fig_17
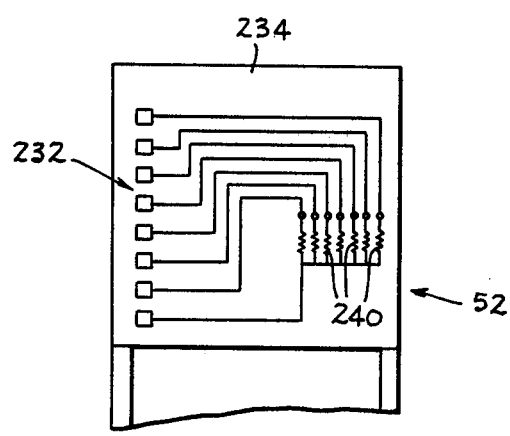
Fig_18

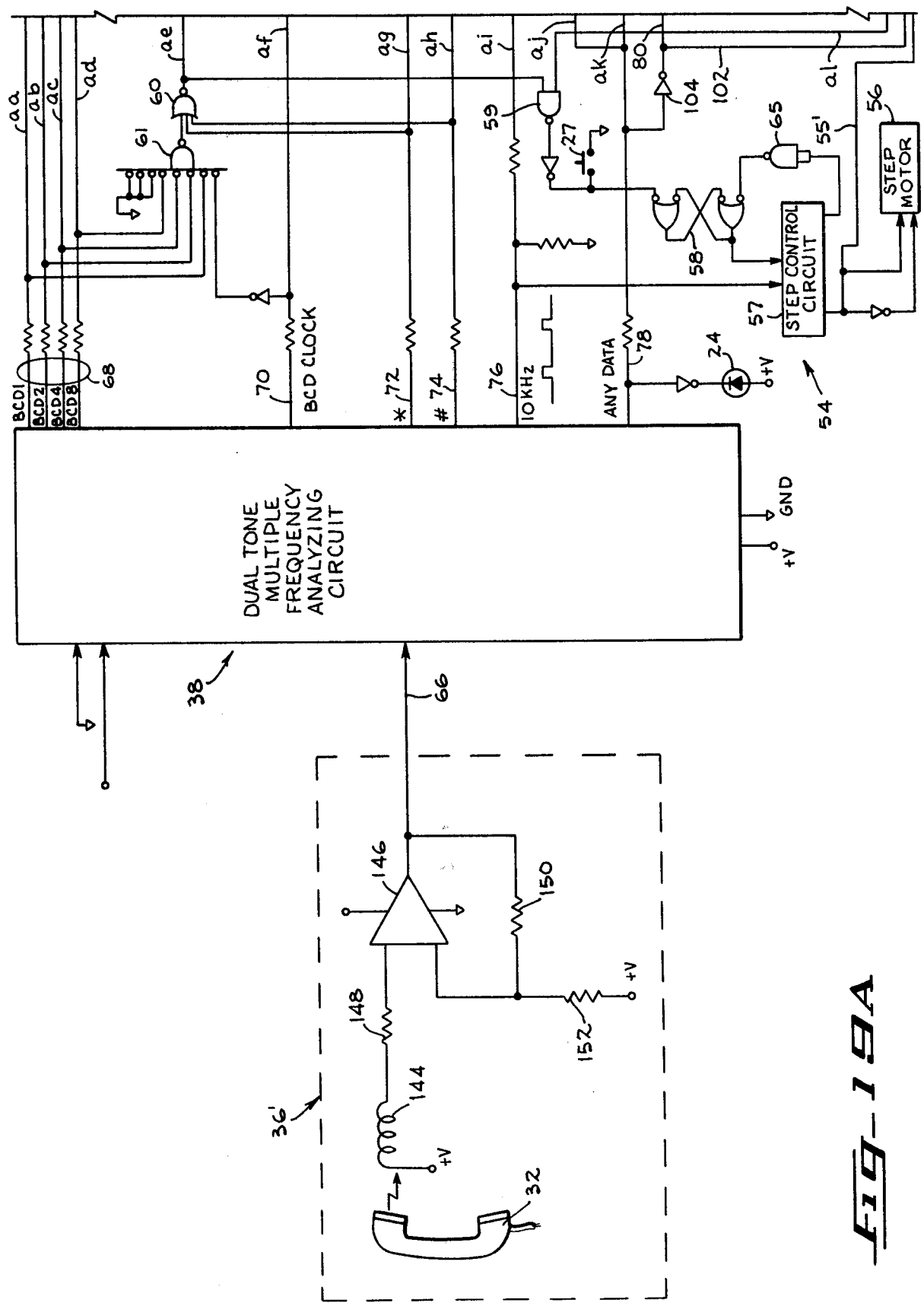

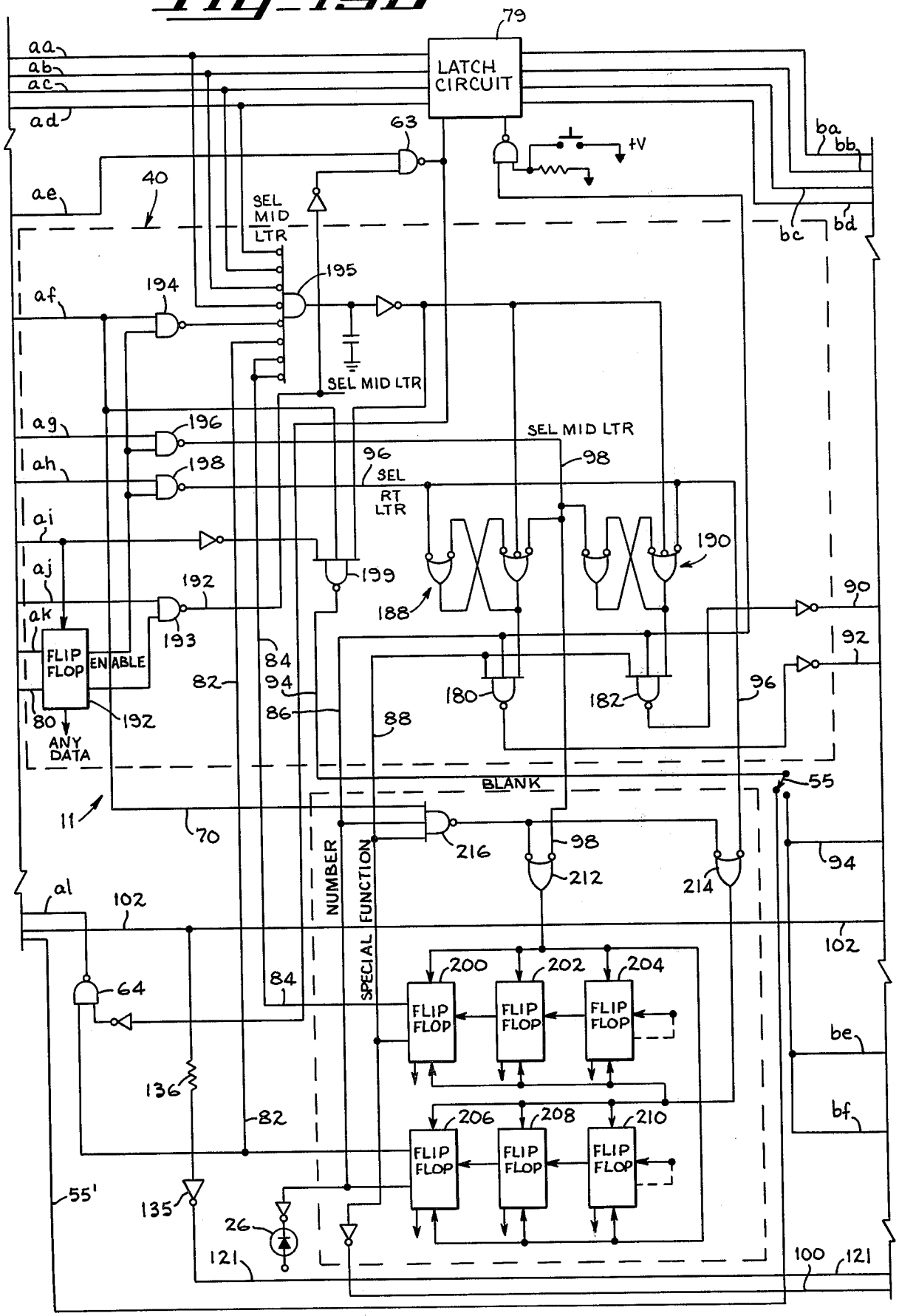

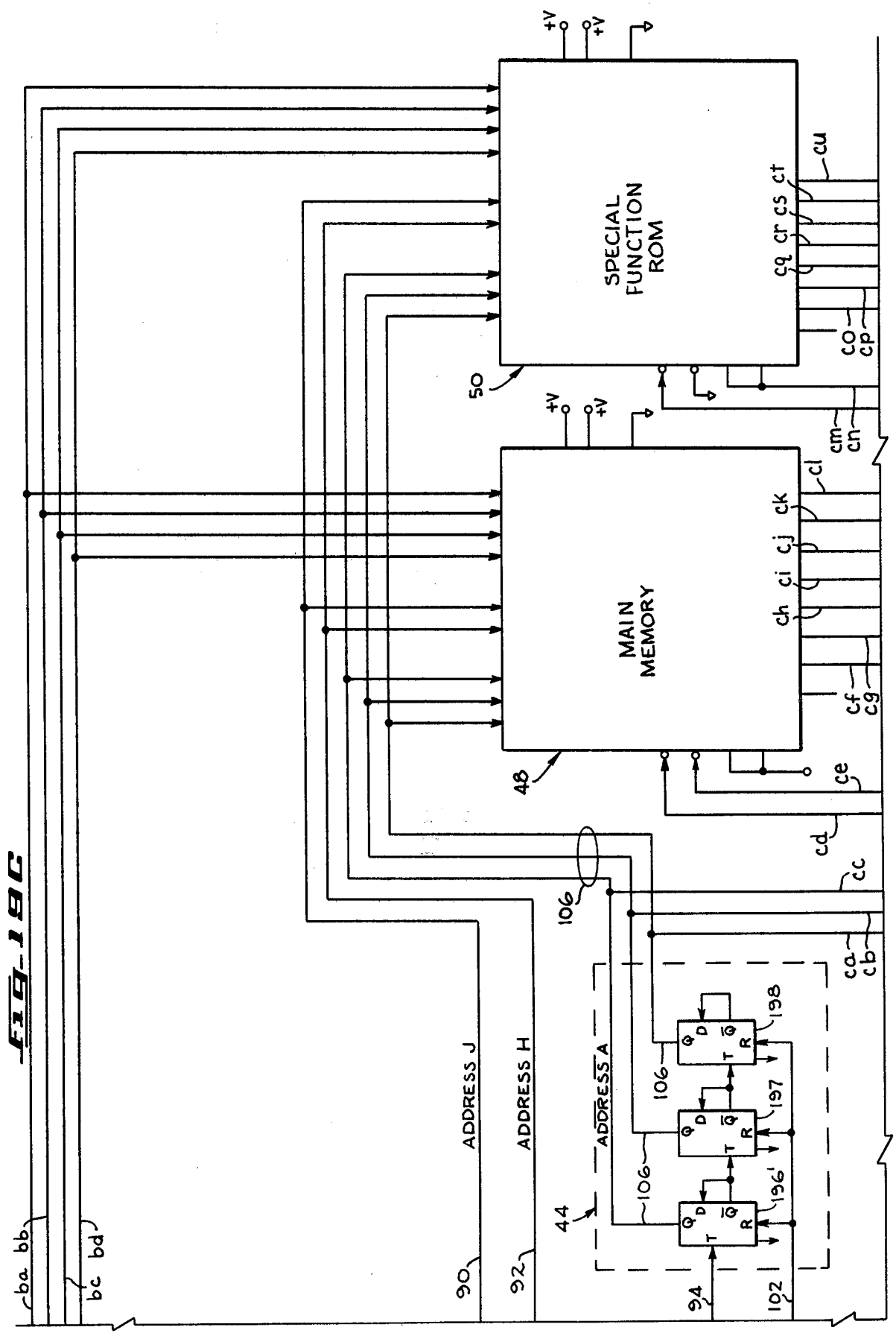

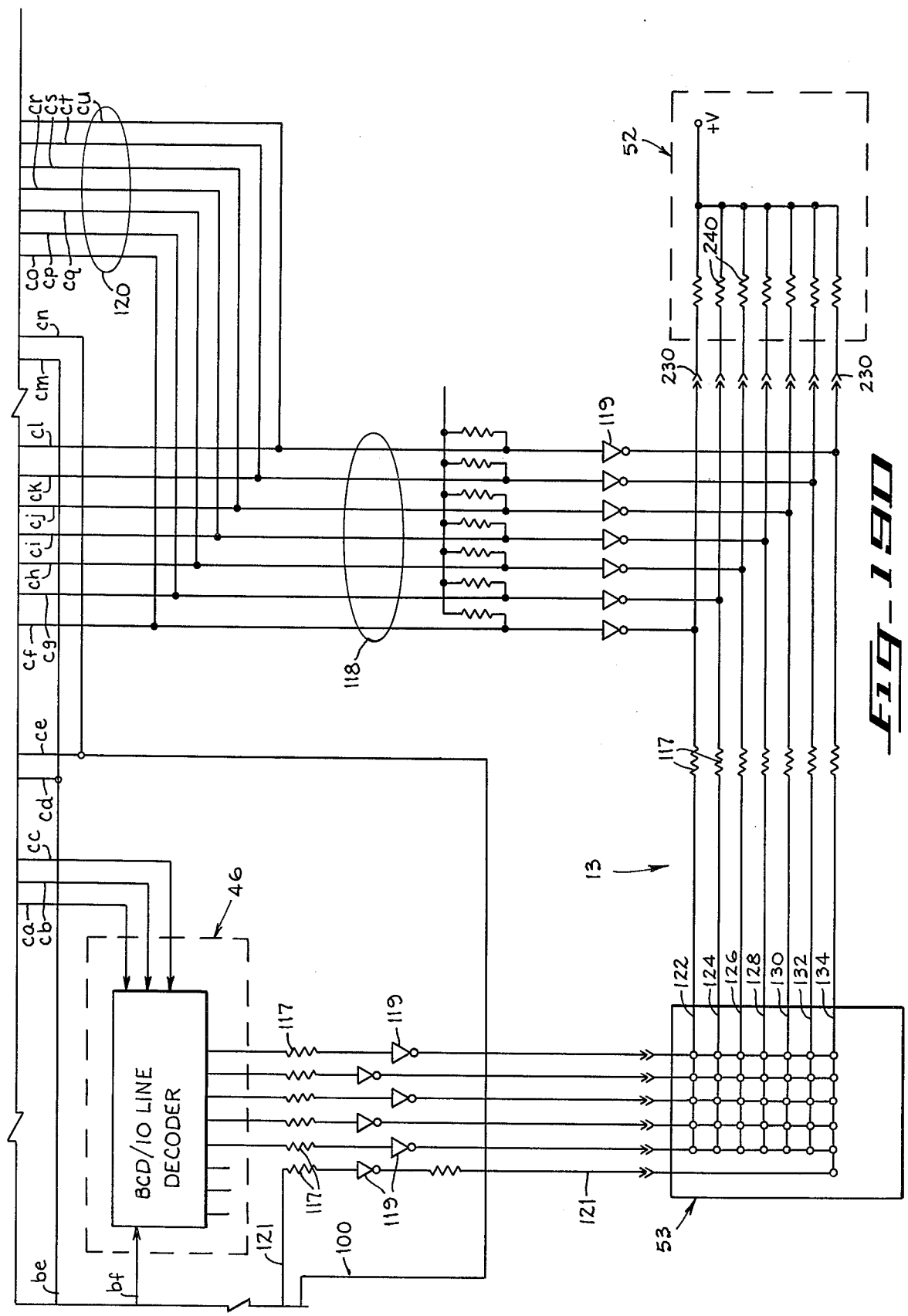

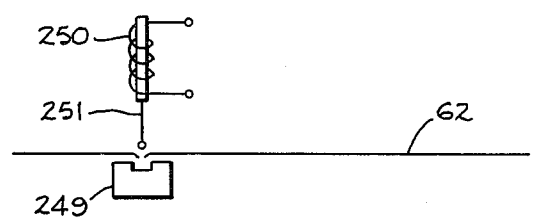
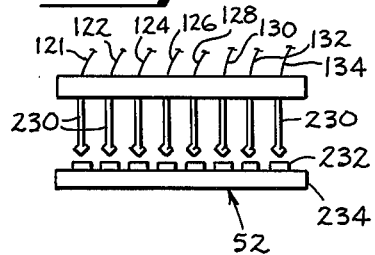
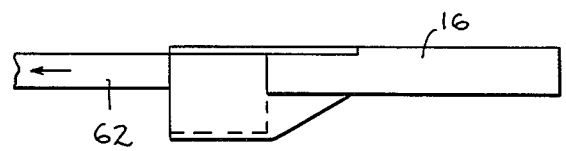
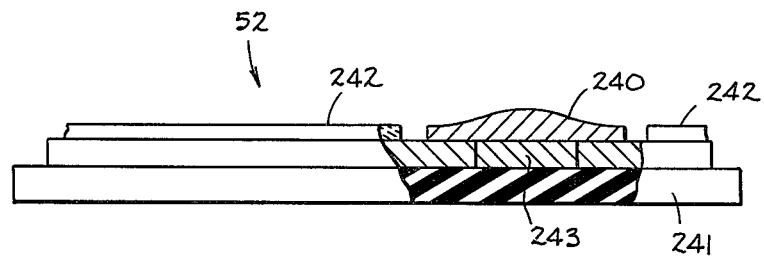

PUSHBUTTON DECODER AND PRINTER

BACKGROUND OF THE INVENTION

The present invention relates in general to apparatus for printing telephone messages, and more particulary to apparatus for printing telephone messages in accordance with Touch Tone signals.

The Touch Tone telephone system is rapidly becoming the standard system for the industry. In the Touch Tone telephone system, each of the twelve keys on a Touch Tone pad of a telephone instrument corresponds to a discrete dual tone multiple frequency analog signal. The dual tone multiple frequency analog signal is transmitted over telephone lines to a central station. The dual tone multiple frequency analog signals control the switching logic circuits of a central station to establish telephone connections between subscribers. Once a connection is established between subscriber substations, the dual tone multiple frequency analog signals are used to transmit and receive data, such as alpha numeric symbols, punctuations and other characters.

The widespread availability of Touch Tone technology has made it possible for low cost data transmission devices to be used. Heretofore, such data transmission apparatus did not provide a permanent record of the transmitted data. Thus, a person was required to be present at the receiving station to copy down the data as it was received. Additionally, the lack of printed verification of the transmitted data increased the chances of error at the transmitting station and at the receiving station.

A Touch Tone receiver has been manufactured by Tone Technology Corporation of Sunnyvale, Calif., which processes 2-out-of-8 signal frequencies generated by a Touch Tone telephone to provide discrete output signals corresponding to the character selections. It provides binary coded decimal signals or discrete 1-out-of-16 signals.

Telaris Telecommunications, Inc. of Irvine, Calif., has manufactured a Touch Tone decoder, in which Touch Tone signals comprising sixteen telephone standard 2-of-8 codes are received, processed and output as logic levels or discrete pins. It provides binary coded decimal signals or discrete 1-of-16 signals. The dual tone input signals are buffered by a bridging input amplifier from which the dual tone input signals are separated by HI and LO pass filters. The separated HI and LO signals are squared by limiters for delivery to the HI and LO envelope detectors. The valid and invalid signals are secured by a speech detector and the relative level of the valid and invalid signals is monitored by comparator circuits. The HI and LO frequency signals are counted and decoded.

In the patent to Tunzi, U.S. Pat. No. 4,067,178 issued on Jan. 10, 1978, for Variable Frequency Waveform Synthesizer, there is disclosed a variable frequency waveform synthesizer in which a waveform at a desired frequency is repetitively generated with each cycle of the waveform generated at N discrete steps.

In the patent to Nilssen et al., U.S. Pat. No. 3,959,603, issued on May 25, 1976, for Dual Tone Multiple Frequency Receiver/Decoder, there is disclosed apparatus for separating two analog component signals which make up a dual tone multiple frequency signal. The component signals are converted into digital identification signals. The identification signals are recombined and develop a digital output signal which corresponds to the input signal. A digital logic circuit is responsive to the identification signals to produce 1-of-16 digital output signals which correspond to the touch tone signal input.

SUMMARY OF THE INVENTION

Apparatus for sequentially printing characters along a tape in response to the reception of a sequence of Touch Tone signals transmitted over a telephone communication system.

The apparatus of the present invention comprises a Touch Tone decoder, control logic circuits and a printer to provide a printed record of data transmitted to a telephone subscriber.

An object of the present invention is to provide apparatus comprising a Touch Tone decoder, control logic circuits and a printer that employs digital circuits to produce a low cost, simple and reliable device.

Another object of the present invention is to provide apparatus for printing characters in response to the receipt of Touch Tone signals which apparatus employs sensitive ribbon or tape housed in a disposable cassette. The cassette comprises a low cost print head. The ribbon or tape may be thermally, electrically or mechanically sensitive material.

By virtue of the present invention, data can be transmitted over a conventional telephone system and the data can be recorded on printed copy for the subscribers. A printed copy of transmitted and received data improves the accuracy of the data transmission. It frees persons at the subscriber stations from being present during the transmission to record the data. The printing capabilities of the apparatus of the present invention makes it suitable for special purpose application, such as recording messages in printed form for use by an absent subscriber, and printing messages inexpensively for deaf persons to enable deaf persons to use the telephone system, and providing thermal imprinting on thermally sensistive material or mechanical imprints that can be touched to be read for use by a person with impaired vision.

DESCRIPTION OF THE DRAWINGS

FIG. 3 is a diagrammatic illustration of a matrix of Touch-Tone dial pad employed in the apparatus shown in FIG. 1.

FIG. 4 is a graphic illustration of a 1-out-of-4 twice signal wave form produced by the Touch-Tone dial pad shown in FIG. 3.

FIG. 5 is a table setting forth the BDC and decimal equivalents of the 1-out-of-4 twice signals produced by the Touch Tone pad shown in FIG. 3.

FIG. 6 is a table setting forth the characters and key sequence for transmission in the alpha mode.

FIG. 7 is a block diagram of the apparatus shown in FIG. 1.

FIG. 8A is a schematic diagram of a telephone line coupling employed in the apparatus shown in FIG. 1.

FIG. 8B is a schematic diagram of a modification of the telephone line coupling and amplifier shown in FIG. 8A.

FIG. 9 is a block diagram of a dual tone multiple frequency analyzing circuit employed in the apparatus shown in FIG. 1.

FIG. 10 is a schematic diagram of a select letter control logic circuit employed in the apparatus shown in FIG. 1.

FIG. 11 is a schematic diagram of an up-counter or scanner employed in the apparatus shown in FIG. 1.

FIG. 12 is a schematic diagram of a select function control logic circuit employed in the apparatus shown in FIG. 1.

FIG. 13 is a table setting forth the addresses of alpha numeric characters stored in a main ROM memory embodied in the apparatus shown in FIG. 1.

FIG. 15 is a schematic diagram of a step motor control circuit to advance paper for a printing mechanism embodied in the apparatus shown in FIG. 1.

FIG. 16 is a perspective view of a ribbon or paper tape cassette and ribbon or paper tape drive mechanism for the printer incorporated in the apparatus shown in FIG. 1.

FIG. 17 is a cross-sectional view taken along line 17—17 of FIG. 16.

FIG. 18 is a fragmentary view in elevation of a print head taken along line 18—18 of FIG. 17.

FIGS. 19A-19D are schematic diagrams of circuits adaptable for use in the apparatus shown in FIG. 1.

FIG. 20 is a diagrammatic illustration of a portion of the print head.

FIG. 21 is an elevation view of a cassette and thermally sensitive paper projecting therefrom.

FIG. 22 is a diagrammatic illustration of a portion of the print head.

FIG. 23 is a digrammatic illustration of a mechanical printer head for persons with impaired vision.

DETAILED DESCRIPTION OF THE PREFERRED EMBODIMENT

Figure 1:
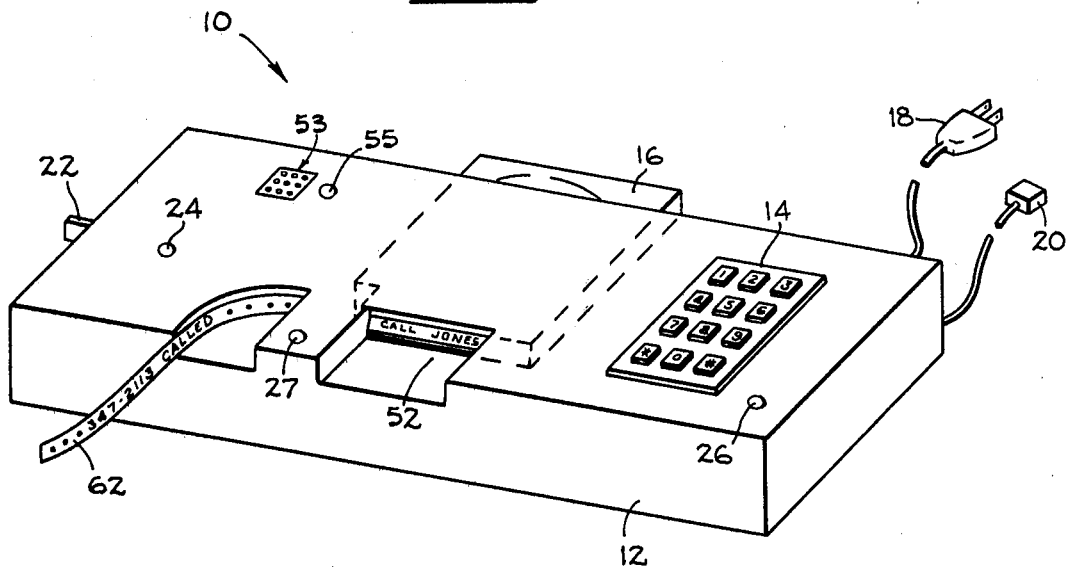
FIG. 1 is a perspective view of the apparatus embodying the present invention.

Illustrated in FIG. 1 is the apparatus 10 embodying the present invention which comprises a suitable chassis 12 for housing electronic circuits. Mounted on the chassis 12 is a Touch Tone pad 14 and a ribbon or paper tape cassette 16. The Touch Tone pad 14 may be of the type well known in telephone subscriber stations or it may be any suitable keyboard or device to produce Touch Tone signals. Received by the chassis 12 is a power cable 18 and a telephone line patch cable 20. Extending through an elongated slot in the chassis 12 is a release lever 22. By operating the release lever 22, the cassette 16 is released from the chassis 12 in a manner to be described hereinafter. An indicator lamp 24 is illuminated when the telephone line is on. An indicator lamp 26 is illuminated to indicate whether the apparatus 10 is in the numeric or in the non-numeric mode. A paper advance switch 27 is also mounted on the chassis 12.

Figure 2:
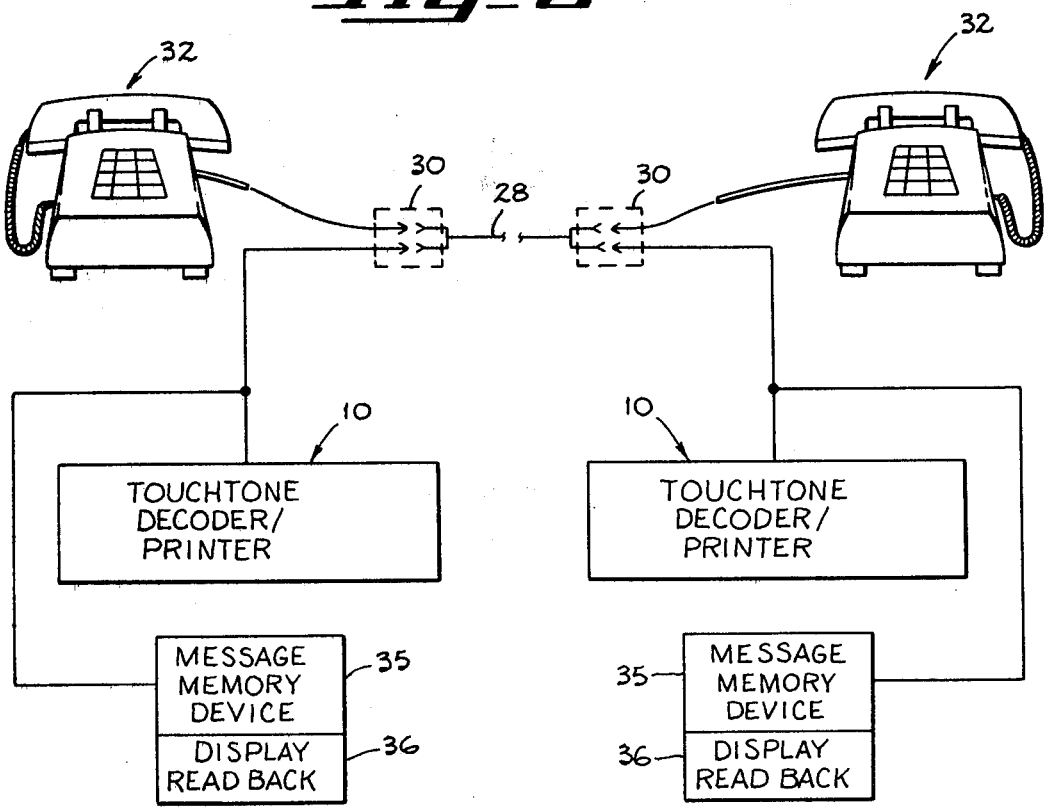
FIG. 2 is a diagrammatic illustration of a telephone system employing the apparatus shown in FIG. 1.

In the exemplary embodiment, there is an apparatus 10 for each subscriber station 32. As shown in FIG. 2, the apparatus 10 is coupled to its associated telephone line 28 through a pair of two-input telephone jacks 30. Also coupled to each subscriber station 32 is an auxiliary message memory device 35 and a display read back 36. The message memory device 35 and the display read back may be conventional and well-known devices.

The standard telephone Touch Tone pad 14 (FIG. 1) has three columns and four rows (FIG. 3). Corresponding with each row of the Touch Tone pad 14 is a discrete low frequency audio signal L. Corresponding with each column of the Touch Tone pad 14 is a discrete high frequency tone H. The lowest tone $H_1$ of the high frequency tones H is higher in frequency than the highest tone $L_4$ of the low frequency tones L.

When a key of the Touch Tone pad 14 is actuated, a Touch-Tone signal 34 (FIG. 4) is produced that is equivalent to the algebraic sum of the low level tone signal L and the high level tone signal H. Thus, each key on the Touch Tone pad 14 produces a discrete waveform that corresponds to the algebraic sum of a low frequency tone signal and a high frequency tone signal.

The signals resulting from the actuation of the keys of the Touch Tone pad 14 are coded dual tone multiple frequency signals. In the exemplary embodiment, the code is the well-known 1-out-of-4 twice code. One-out-of-four twice tone frequencies are used to generate a dual tone multiple frequency code signal. In FIG. 5, a table is shown which compares the 1-out-of-4 twice signals with their corresponding BCD and decimal equivalence. The 1-out-of-4 twice codes corresponding to the $L_4H_1$ and $L_4H_3$ have no BCD equivalent, since they represent the asterisk symbol and the number symbol. Other characters may be present in the matrix for the Touch Tone pad 14 (FIG. 6) for which corresponding 1-out-of-4 twice code signals may be generated.

In operation, a calling party dials the called party in a conventional manner. To record a message at the called station and optionally at the calling station, the calling party listens for a beep sound. If the beep sound is fed back to the calling party, the calling party can transmit data to be recorded at the called station. The transmission occurs when there is present a switch-through at the called station, the effect of which is similar to removing the handset from the cradle of the substation.

To transmit non-numeric data, the calling party again observes a lamp 26. If the lamp 26 is extinguished, then one of the three keys in row $L_4$ (FIG. 3) is operated to indicate the location in which the non-numeric character to be transmitted appears. By way of example, if the asterisk key $L_4H_1$ is actuated, it would indicate the selection of the left most letter key. Should the zero key $L_4H_2$ be actuated, then it would indicate the selection of the center letter. Lastly, the actuation of a numeral symbol key $L_4H_2$ indicates the selection of the right most letter. Assuming, by way of example, that the lamp 26 is extinguished and the calling subscriber desires to transmit the letter "V" to the called station, the calling subscriber actuates the "TUV" key $L_3H_2$ and then actuates the # key in row $L_4$ and column $H_3$.

If a message is to be transmitted in the alpha mode, a calling party dials the called party in a conventional manner. To record a message at the called station, the called party listens for a beep sound. When the beep sound is fed back to the calling party, the called station is ready to receive and print messages. There is a switch through to the called station. Thereupon, the calling party actuates the asterisk key ($L_4H_1$) (FIG. 3) three times, and a message in the alpha mode is ready for transmission. In the alpha mode, two keys are actuated for each alpha character in accordance with the character code shown in FIG. 6. For example, to transmit the character "B," the calling party actuates the key $L_1H_2$ (ABC) (FIG. 3) followed by the actuation of the key $L_4H_2$ (o). At the end of the message, the following characters are transmitted (.*.*.*), which is transmitted by the actuation of the following keys: $L_1H_1$, $L_4H_1$, $L_1H_1$, $L_4H_1$, $L_1H_1$, $L_4H_1$, $L_1H_1$, and $L_4H_1$. For spacing, the code is the same as the code for the end of the message. To change over to a numerical mode, the calling party actuates the key $L_4H_3$ (#) three times, which illuminates the lamp 26, and the number mode is prepared for transmission. Thereupon, the numbers to be transmitted to the calling party are selected. For example, should it be desired to transmit the number 123, the calling party actuates the keys $L_1H_1$ (1), $L_1H_2$ (2) and $L_1H_3$ (3). To return to the alpha mode, the calling party actuates the asterisk key ($L_4H_1$) three times.

In summary, the calling party dials the called party's telephone number. The calling party listens for a beep tone. Thereupon, the calling party actuates the asterisk key $L_4H_1$ three times and the alpha mode is ready. To change over to a number mode, the calling party actuates the # key $L_4H_3$ three times and the number mode is ready. The calling party then selects one or more of the desired numbers. Should the calling party desire to return to the alpha mode, the calling party actuates the asterisk key $L_4H_1$ three times.

The apparatus 10 (FIG. 7) comprises a Touch Tone decoder 11, which is coupled to the telephone handset 32 through a line coupling circuit 36. The Touch Tone decoder 11 includes a dual tone multiple frequency analyzing circuit 38. Interconnecting the line coupling circuit 36 and the dual tone multiple frequency analyzing circuit 38 is a telephone cable 66. Over the cable 66 is transmitted the character data signals generated by the Touch Tone pad 14. In turn, the dual tone multiple frequency analyzing circuit 38 generates in parallel BCD output signals for transmission over BCD address lines 68. Additionally, the dual tone multiple frequency analyzing circuit 38 applies BCD clock pulses over a conductor 70. When the asterisk key of the Touch Tone pad 14 is actuated, the dual tone multiple frequency analyzing circuit 38 applies a high logic level signal over a conductor 72. When a number key of the Touch Tone pad 14 is actuated for the transmission of a number character signal, the dual tone multiple frequency analyzing circuit 38 applies a high logic level signal over a conductor 74. During the time a Touch Tone signal is carried over the cable 66, a 10K $H_Z$ clock signal is applied over a conductor 76 and a high logic level signal, any data, is applied over a conductor 78.

Connected to the output of the dual tone multiple frequency analyzer circuit 38 over the conductors 68, 70, 72, 74, 76 and 78 is a select letter control logic circuit 40 of the Touch Tone decoder 11. A latch circuit 79 latches the signal input to the select letter control logic circuit from the dual tone multiple frequency analyzing circuit 38. In addition thereto, a conductor 80 is connected to the input side of the select letter control logic circuit 40 over which is carried a not-any-data signal. Connected to the output side of the select letter control logic circuit 40 are conductors 90 and 92 over which address signals are carried for transmission to a special function ROM memory 48 or 50. A conductor 94 is connected to the output side of the select letter logic circuit 40 for transmission of a clock signal to an up counter 44 of the Touch Tone decoder 11. The output of the select letter control logic circuit 40 is also connected to a select function control logic circuit 42 of the Touch Tone decoder circuit 11 over conductors 96 and 98. No-number logic level signals are transmitted over the conductor 86 and non-asterisk logic level signals are transmitted over the conductor 98. Logic signals produced by the select function control logic circuit 42 are sent to the select letter control logic circuit 40 over conductors 82, 94, 86, and 88.

As previously described, the output signals of the select letter control logic circuit 40 is transmitted to the select function control logic circuit 42 over the conductors 96 and 98. The select function control logic circuit 42 applies a high level logic signal over the conductor 82 when there is a special function character to be transmitted to the called station. In addition thereto, the select function control logic circuit 42 transmits a high level logic signal over the conductor 84 when a numerical data signal is to be sent to the called station. The select function control logic circuit 42 applies to the conductor 86 a logic signal that is the inverse of the logic signal applied to conductor 84. Similarly, the select function control logic circuit 42 applies to the conductor 88 a logic signal that is the inverse of the logic signal applied to the conductor 82. Lastly, the select function logic circuit 42 sends an ROM select signal over a conductor 100 to the special function ROM memory 48 or 50.

Over the conductor 94, clock pulses are sent from the select letter control logic circuit 40 to the up counter 44. Also applied to the up counter 44 over a conductor 102 is a not-any-data signal. The not-any-data signal is transmitted from the output of the dual tone multiple frequency analyzing circuit 38 through an inverter circuit 104. The output of the up counter 44 is connected over parallel conductors 106 to a BCD-to-10 line decoder circuit 46 of the Touch Tone decoder 11 to a main memory 48 of the Touch Tone decoder 11 and to the special function ROM memory 50. Over the parallel conductor 106 are transmitted BCD address signals. The BCD address signals represent a count from 0-7.

Over the conductor 94, clock pulses are transmitted from the output of the select letter control logic circuit 40 to the BCD-to-10 decoder 46. Counting pulses are sent to the BCD-to-10 decoder 46 from the up counter 44 over the parallel conductor 106. The output of the BCD-to-10 decoder 46 is applied to a 5×7 LED matrix display 53 and to print head 52 of a printer 13 over conductors 108, 110, 112, 114 and 116 through a series of inverter amplifiers 119. Current limiting resistors 117 are disposed between the LED matrix display 53 and the inverter amplifiers 119. Thus, the select letter control circuit receives the BCD signals and the control logic signals and addresses the selected ROM memory to produce parallel multiplex output signals for controlling the operation of the LED matrix display 53 and the print head 52 of the printer 13.

The main ROM memory 48 and the special function ROM memory 50 are addressed in parallel over conductors 68, 90, 92 and 106. In the preferred embodiment, the main ROM memory 48 and the special function ROM memory 50 store 8-bit words and 512 addressable memory locations. For addressing the 512 locations of the ROM memories 48 and 50, 9-bit words are employed, which are represented by the bit symbol $A_8 A_7 A_6 A_5 A_4 A_3 A_2 A_1 A_0$. The two highest bits, i.e. $A_8$ and $A_7$ are applied to conductors 90 and 92, respectively, while bits $A_6$, $A_5$, $A_4$ and $A_3$ are applied to the BCD address conductors 68 and the $A_2$, $A_1$ and $A_0$ are applied to the counter conductors 106.

The ROM memory 48 and the special function ROM memory 50 include input terminals designated $X_1$, $X_2$, $Y_1$ and $Y_2$. The input terminal $X_1$ of the main ROM memory 48 is coupled to the conductor 94. The input terminal $X_2$ of the main ROM memory 48 is connected to the conductor 100. Input terminals $Y_1$ and $Y_2$ of the main ROM memory 48 are connected to a source of high logic level signals. In the ROM memory 50, the input terminal $X_1$ thereof is coupled to the conductor 94 and the input terminals $Y_1$ and $Y_2$ thereof are connected to the conductor 100. The input terminal $X_2$ of the ROM memory 50 is connected to a source of low level logic signals. Thus, the $X_1$, $X_2$, $Y_1$, $Y_2$ input terminals are employed to receive signals for turning the main memory ROM 48 and the special function ROM memory 50 on or off, and thereby alternately select the ROM memory to be addressed.

Should the main ROM memory 48 be turned ON, the addressed data signals stored in the main memory ROM 48 will be transmitted over the parallel conductors 118. In a like manner, should the special function ROM memory 50 be turned ON, the addressed data signals stored in the special function ROM memory 50 will be transmitted over the parallel conductors 120. The address data signals carried over the conductors 118 and the data signals carried over the conductors 120 are advanced to the print head 52 over row lines 122, 124, 126, 128, 130, 132 and 134.

The parallel conductors 118 and the parallel conductors 120 are connected to the row lines 122, 124, 126, 128, 130, 132 and 134 of the print head 52 through the serially connected current limiting resistors 117' and the inverting amplifiers 119'.

In the exemplary embodiment, the printer 13 includes the 5×7 LED matrix display 53. When a dot 136 of semi-conductive material is disposed between a row of the matrix and a column of the matrix having a high level logic signal applied thereto, the dot 136 so positioned is illuminated. In the preferred embodiment, the dot 136 of semi-conductive material emits light primarily within the infrared region of the light spectrum, since the print head 52, in the exemplary embodiment, prints on a thermally sensitive tape 62. Thus, the matrix display of the print head 52 enables verification of the input-output characters.

The print head 52 is in direct contact with the thermally sensitive tape 62. After a character has been printed on the tape 62 by the print head 52, the tape 62 is advanced one column. Toward this end, the printer 13 includes a step motor control circuit 54. The output of the step motor control circuit 54 is connected to a step motor 56 of the printer 13 over a cable 138. The step motor control circuit 54 senses the completion of a character print-out by the print head 52 and applies a pulse to the step motor 56 over the conductor 138 to advance the ribbon or tape 62 one column for one character space. A platen 58 is rotated by the step motor 56 to advance the tape 62 the increment of one character space for the succeeding operation of the print head 52.

Illustrated in FIG. 8A is the telephone line coupling 36 which comprises a capacitor 140 for coupling the telephone line to the cable 66. The coupling 36 also includes a load resistor 142, which couples the telephone line to the ground. The capacitor 140 serves to pass only the AC component of the signal transmitted over the telephone to prevent overloading the dual tone multiple frequency analyzing circuit 38.

A modification 36' of the telephone line coupling 36 is shown in FIG. 8B. The line coupling 36' includes a coupling inductor 144. One end of the coupling inductor 144 is connected to the non-inverting input of an operational amplifier 146 through a resistor 148. The output of the amplifier 146 is connected to the conductor 66 and to a feedback resistor 150. The feedback resistor 150 is connected to the inverting input of the amplifier 146. The inverting input of the amplifier 146 is connected to the ground through a resistor 152. The feedback resistor 150 provides feedback stabilization for the operation amplifier 146.

Illustrated in FIG. 9 is the dual tone multiple frequency analyzing circuit 38, which comprises a high pass filter 154 and a low pass filter 162. Connected to the output of the high pass filter 154 is a linear amplifier 156 and connected to the output of the low pass filter 162 is a linear amplifier 164. A counter 158 is connected to the output of the linear amplifier 156 and a counter 166 is connected to the output of the linear amplifier 164. Connected to the counter 158 is a decoder circuit 160 and connected to the counter 166 is a decoder circuit 168. A dual tone multiple frequency converter, such as a 1-out-of-4 twice to BCD converter 170 is connected to the output of the decoder circuit 160 and the output of the decoder circuit 168.

The high pass filter 154 receives the Touch Tone signal transmitted over the conductor 66 and passes therethrough a signal over the conductor 172 made up of the high frequency component of the Touch Tone signal. The low pass filter 162 receives the Touch Tone signal transmitted over the conductor 66 and passes therethrough a signal over the conductor leading to the linear amplifier 164, the low frequency component of the Touch Tone signal. The linear amplifier 156 amplifies the high frequency component of the Touch Tone signal and advances the amplified signal over the conductor 174 to the counter 158. In a similar manner, the linear amplifier 164 amplifies the low frequency component of the Touch Tone signal and advances the amplified signal to the counter 166. The decoder circuit 160 selects four high level logic signals of a predetermined high frequency and feeds the data to the 1-out-of-4 twice to BCD converter 170. In a like manner, the decoder circuit 168 selects four low level logic signals of a predetermined low frequency and feeds the data to the 1-out-of-4 twice to BCD converter 170.

In FIG. 10 is illustrated the select letter control circuit 40. The select letter control circuit 40 produces signals for transmission over the address conductors 96 and 98 to the select function control logic circuit 42. The signals produced by the select letter control circuit 40 for transmission over the conductors 96 and 98 address word blocks that are located with the ROM memories 48 and 50. The word blocks stored in the ROM memories 48 and 50 correspond to the numbers, the left hand letters, the middle letters and the right hand letters of the Touch-Tone pad 14 (FIG. 3). In the exemplary embodiment, a low logic level signal on conductor 90 and a low logic level signal on conductor 92 addresses the number block of data stored in the ROM memories 48 and 50. A low level logic signal on the conductor 90 and a high level logic signal on the conductor 92 addresses the left letters block of data stored in the ROM memories 48 and 50. A high level logic signal on the conductor 90 and a high level logic signal on the conductors 92 addresses the middle letters block of data stored in the ROM memories 48 and 50. A high level logic signal on the conductor 90 and a low level logic signal on the conductor 92 addresses the right letters block of data stored in the ROM memories 48 and 50.

When the select letter control logic circuit 40 is operating in a number mode, the conductor 90 has a low level logic signal applied thereto and the conductor 92 has a low level logic signal applied thereto. Thus, the output of NAND gates 180 and 182 is high. When a letter character is to be transmitted, conductors 90 and 92 have high level output signals applied thereto or opposite level logic signals applied thereto. In order for the conductors 90 and 92 to have high level output signals applied thereto, the output of the NAND gates 180 and 182 is low. Hence, conductors 86 and 88 have high level logic signals applied thereto to indicate a letter character is to be transmitted. When the conductors 86 and 88 have high level logic signals applied thereto, conductors 184 and 186 control the output level of the NAND gates 180 and 182. The output level of the logic signals applied over the conductors 184 and 186 is determined by the output level of latching NOR gates 188 and 190 respectively.

When a data conductor 78 has a high level logic signal applied thereto, the output of a flip-flop circuit 192 is high. The high output of the flip-flop circuit 192 enables NAND gates 194, 196 and 198 to conduct. The flip-flop circuit 192 and a NAND gate 193 provide a "D" bouncer signal. When the select letter control logic circuit 40 is not in a numeral mode and not in a special character mode, the conductors 86 and 88 have a high level logic signal applied thereto and the conductor 72 has a high level logic signal applied thereto. A low level logic signal is applied to the conductor 98. This condition indicates a left letter is not selected. As a consequence thereof, a high level logic signal is applied to the conductor 184 and a low level logic signal is applied to the conductor 186. Thereupon, a low level logic signal is applied to the conductor 90 and a high level logic signal is applied to the conductor 92. The latching gates 188 and 190 maintain the logic level signals on the conductors 184 and 186, respectively.

When the logic signals applied to the conductors 86 and 88 are of a high level and a high level logic signal is applied to the conductor 74, a low level logic signal is applied to the conductor 96. The low level logic signal applied to the conductor 96 corresponds to the logic state of not selecting a right letter. Under these circumstances, a high level output signal is latched on the conductor 186 and a low level output signal is latched on the conductor 184. Thereupon, a high level logic signal is applied to the conductor 90 and a low level logic signal is applied to the conductor 92.

When the conductors 86 and 88 have high level logic signals applied thereto and the zero number key is actuated on the Touch Tone pad 14, a high level logic signal is applied to the conductor 70 and a BCD signal corresponding to $0000_2$ will be applied to the conductors 68. With low level logic signals applied to conductors 82 and 84 and the inverted high level logic signals applied to the conductors 86 and 88, the inverted input signal applied to an AND gate 194 will produce a high level output signal in an OR gate 195. A low level logic signal is applied to the conductor 96 to indicate that a middle letter is not selected. As a consequence thereof, a high level logic signal is applied to the conductor 184 and to the conductor 186. In turn, a high level logic signal is applied to the conductor 90 and a high level logic signal is applied to the conductor 92.

In FIG. 11 is illustrated the up counter 44. The up counter 44 comprises in series "D" type flip-flop circuits 196', 197 and 198. The "D" type flip-flop circuits count from 0 to 7 by being triggered by clock pulses transmitted over a conductor 94. Output address conductors 106 conduct the address signals to the ROM memories 48 and 50 to the BCD to 10 line decoder 46. The up counter 44 is reset to zero by a not-any-data signal, which is a low level logic signal applied to the conductor 102. The low level logic signal is applied to the conductor 102 by actuating the asterisk key of the Touch Tone pad 14.

The select function logic circuit 42 (FIG. 12) comprises "D" type flip-flop circuits 200, 202 and 204 and also "D" type flip-flop circuits 206, 208 and 210. The asterisk signal transmission is enabled by the conduction of the inverting-input OR gate 212 and the number signal transmission is enabled by inverting-input OR gate 214. Gates 212 and 214 are enabled by AND gate 216 when conductors 70, 86 and 88 do not have applied thereto simultaneously high level logic signals. Under these conditions, a high level logic signal is applied to the conductor 98.

When the select function control logic circuit 42 produces a high logic level signal for transmission over its conductor 100, it operates in a special function mode. In the special function mode, the special function ROM memory 50 is selected for operation. When the output signal applied to the conductor 100 is a low level logic signal, the main ROM memory 48 is selected for operation.

FIG. 13 illustrates the stored data of the main ROM memory 48. The main ROM memory 48 is divided into four major word blocks corresponding to number characters, left letter characters, right letter characters and middle letter characters. The high bits $A_8$ and $A_7$, which are transmitted over conductors 90 and 92, select one of the four blocks for each Touch-Tone signal. Within the blocks, the BCD code is found in bits $A_6$, $A_5$, $A_4$ and $A_3$. The BCD code signals are transmitted over the conductors 68 to select the designated number or letter within the group in accordance with the transmission of the Touch Tone signal. The lower bits $A_2$, $A_1$ and $A_0$ are used to address a column of the matrix.

Figure 14:
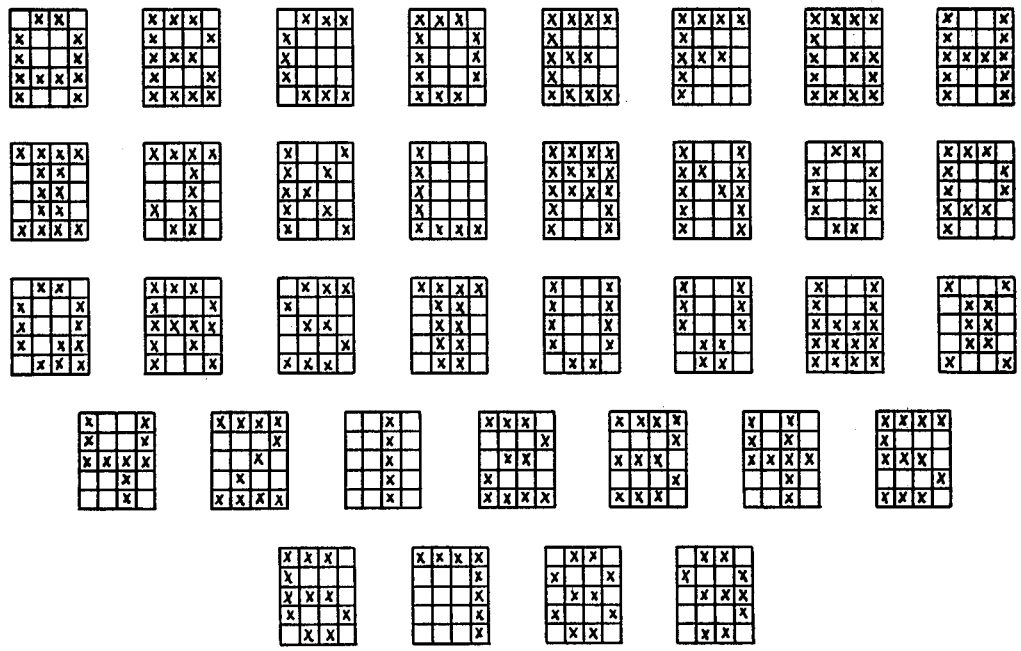
FIG. 14 is a diagrammatic illustration of matrix configurations for the alpha numeric characters as stored in a memory incorporated in the apparatus shown in FIG. 1.

In FIG. 14, each of the matrices is addressed by the BCD code bits $A_6$, $A_5$, $A_4$ and $A_3$. Each of the columns of the matrices is sequentially addressed by the bits $A_2$, $A_1$ and $A_0$. The designated bits along one column of a matrix corresponds to one word of memory. While the apparatus 10 of the present invention, in the preferred embodiment, employs $5 \times 7$ matrices, the $4 \times 5$ matrices shown in FIG. 14 may be employed in the apparatus 10 of the present invention. Such $5 \times 7$ matrices are conventional and well-known in the art.

The printer 13 includes the step motor control circuit 54 (FIG. 15). For stepping the motor 56 (FIG. 19A), a step control circuit 57 has its input side connected to the conductor 76 over which is transmitted the 10K Hz clock pulse. Also, connected to the input side of the step control circuit 57 is a flip-flop circuit 58 which pulses the step control circuit on each change of state. The flip-flop circuit 58 is connected to an AND gate 59, which, in turn, is connected to a NOR gate 60. The input side of the NOR gate 60 is connected to the output of a NAND gate 61. The asterisk signal and the number signal are applied to the NOR gate 60 over the conductors 72 and 74. The input terminals of the NAND gate 61 are connected to the BCD 1, BCD 2, BCD 4 and BCD 8 output terminals of the dual tone multi-frequency analyzing circuit 38.

The output of the NOR gate 60 is also connected to an NAND gate 63 (FIG. 19B). Other inputs of the NOR gate 60 are also connected to conductors 72 and 74 over which are transmitted COLUMN SELECT signals. The output of the NAND gate 63 is applied to a NOR gate 64. The output of the NOR gate 64 is applied to the other input side of the AND gate 59. Through this arrangement, the step motor 56 is energized to rotate the platen 58 a prescribed angular distance for advancing the ribbon or paper tape 62 one character space for the succeeding operation of the print head 52. A NAND gate 65 resets the flip-flop circuit 58 after each change of state for the flip-flop circuit 58. A mode switch 55 (FIGS. 7 and 19B) is connected to the output of the step control circuit 57 over a conductor 55'. The mode switch 55 is actuated to shift from a LED matrix display 53 mode to a print head 52 mode.

The printer 13 also comprises the tape cassette 16 (FIGS. 16 and 17), which includes a roll of thermally sensitive material, such as ribbon or paper tape 62. While the exemplary embodiment employs thermally sensitive material, the tape 62 may be electrically or mechanically sensitive material. The roll of ribbon or tape 62 is disposed about a hub 220. Included in the cassette 16 is the print head 52 (FIGS. 16-18). A release lever 22 is pivotally attached to the chassis 12 (FIG. 1) along a pivot line 226 (FIG. 16). A spring 228 connected between the lever 22 and the chassis 12 biases the end of the release lever 22 adjacent to the cassette 16. The biasing action causes the platen 58 to press the adjacent section of the ribbon or tape 218 against the thermal printing head 52. Contact fingers 230 (FIGS. 16, 17 and 20) contact the pads 232 on a shelf 224 so that the print head 52 can be coupled to the operating circuits. The thermal print head 52 is wired to the contact pads 232 on the shelf 224. To remove the cassette 16 from the chassis 12, the release lever 22 is moved against the biasing action of the spring 228 in a direction indicated by an arrow 222 (FIG. 16). In this manner, the platen 58 and the contact fingers 230 are disengaged from the cassette 16.

Thermal printing heads for marking thermally sensitive material are well-known in the art. Such printing heads are formed with film heating elements 240 (FIGS. 17, 18 and 22) of enhanced or increased resistivity aligned in coplanar array. The heating elements 240 are formed on a ceramic substrate 241. One electrode portion of each film heating element 240 is connected to an electrical conductor. The other electrode portion of the film heating element is connected to another electrical conductor. A protective coating 242 is deposited over the conducting structure. A suitable circuit energizes selectively the heating elements 240. Heating element drivers, not shown, are connected in series with the heating elements 240 respectively. Insulation 243 is provided under resistive heating elements 240 to localize rises in temperature. Such well-known thermal printing heads are disclosed in detail in the following patents:

| | |
|---|---|
| M. Vora et al. | No. 3,813,513 |
| R. C. Cady, Jr. | No. 3,515,850 |
| Alexander et al. | No. 3,496,333 |
| Johnson et al. | No. 3,478,191 |
| R. Cady, Jr. | No. 3,609,294 |

When it is desired to have a tape perforated mechanically to be sensed by a person with impaired vision, a recessed pad 249 is disposed below the tape 62. Above the tape 62 is an array of solenoids 250, which are selectively actuated to produce dot imprints on the tape 62 in a manner similar to that for energizing the heating elements 240. Each solenoid 250 has an impact pin 251 on the plunger thereof to penetrate the tape 62, when its associated solenoid 250 is energized, to produce a dot imprint on the tape 62. The dot imprints so formed are sensed by the party at the called station. The tape 62 may be of the pressure sensitive tape manufactured by National Cash Register Company (NCR).

We claim:

1. Apparatus for printing characters along a tape in response to the transmission of audio tone dial signals comprising:
   (a) an audio tone dial decoder for receiving audio tone dial signals and converting the audio tone dial signals into control signals; and
   (b) a printer responsive to the control signals produced by said audio tone dial decoder for printing characters along a tape,
   (c) said audio tone dial decoder comprising:
      (a) a plurality of memory circuits for storing control signals for operating said printer;
      (b) a dual tone multiple frequency analyzing circuit receiving said audio tone dial signals for converting said audio tone dial signals into code signals;
      (c) a select function control logic circuit operatively responsive to said code signals for selecting one of said memory circuits; and
      (d) a select letter control logic circuit operatively responsive to said code signals addressing said selected memory circuit to select therefrom the stored control signals, said selected signals constituting the control signals which operate said printer.

2. Apparatus for printing characters along material having a printable surface in response to the transmission of audio tone dial signal comprising:
   (a) decoder means including:
      (1) dual tone multiple frequency analyzing means responsive to an audio tone dial signal and operative to produce a first address signal representative of the numerical value of said audio tone dial signal when said audio tone dial signal is generated by a numerical key of an audio tone dial device, an asterisk sign signal when said audio tone dial signal is generated by the asterisk key of an audio tone dial device, and a number sign signal when said audio tone dial signal is generated by the number sign key of an audio tone dial device,
      (2) select function means responsive to said first address signal and said number sign signal and operative to produce a number mode signal when a predetermined number of number sign signals are detected,
      (3) select letter means responsive to said first address signal, said asterisk sign signal, said number sign signal and said number mode signal and operative to produce a clock signal and a second address signal, (4) an up-counter responsive to said clock signal and operative to produce a third address signal, (5) main memory means responsive to said first address signal, said second address signal and said third address signal and operative to produce a memory output signal representative of the character indicated by said audio tone dial signal, and (6) multiplexer means responsive to said third address signal and operative to produce a multiplexer signal; and (b) a printer including:

(1) a print head responsive to said memory output signal and said multiplexer signal and operative to produce a printable display of the character indicated by said audio tone dial signal, (2) a supply of material having a printable surface, and (3) means for drawing said material past said print head so that said printable surface retains the image of said display.

3. Apparatus as claimed in claim 2 wherein said printer comprises a plurality of content fingers for transferring said memory output signal and said multiplexer signal to said print head.

4. Apparatus for printing characters along a tape in response to the transmission of audio tone dial signals comprising:

(a) an audio tone dial decoder for receiving audio tone dial signals and converting the audio tone dial signals into control signals; and (b) a printer responsive to the control signals produced by said audio tone dial decoder for printing characters along a tape, (c) said audio tone dial decoder comprising:

(a) a memory circuit for storing control signals for operating said printer;

(b) a dual tone multiple frequency analyzing circuit receiving said audio tone dial signals for converting said audio tone dial signals into code signals; and (c) a select letter control logic circuit for receiving said code signals from said dual tone multiple frequency analyzing circuit and addressing said memory circuit for selecting therefrom the stored signal for operating said printer, (d) said dual tone multiple frequency analyzing circuit comprising:

(a) signal input means for receiving audio tone dial signals, said audio tone dial signals being dual tone multiple frequency signals;

(b) a high pass filter connected to said signal input means for advancing high frequency signals;

(c) a low pass filter connected to said signal input means for advancing low frequency signals;

(d) a first linear amplifier connected to said high pass filter for amplifying high frequency signals;

(e) a second linear amplifier connected to said low pass filter for amplifying low frequency signals;

(f) a first counter circuit connected to the output of said first linear amplifier for producing pulse signals at a frequency related to the frequency of the signal in the output of said first amplifier;

(g) a second counter circuit connected to said second linear amplifier for producing pulse signals at a frequency related to the frequency of the signal in the output of said second amplifier;

(h) a first decoder circuit connected to the output of said first counter circuit for producing data signals in response to the pulse signals produced by said first counter;

(i) a second decoder circuit connected to the output of said second counter circuit for producing data signals in response to the pulse signals produced by said first counter; and (j) a binary code decimal converter circuit connected to said first and second decoders for producing code signals representing the information contained in said dual tone multiple frequency signals in response to the data signals produced by said first and second decoder.

5. An apparatus as claimed in claim 4 wherein said binary code decimal converter circuit is in the form of a 2-out-of-4 twice binary code decimal converter circuit.

* * * * *